Patented Mar. 6, 1934

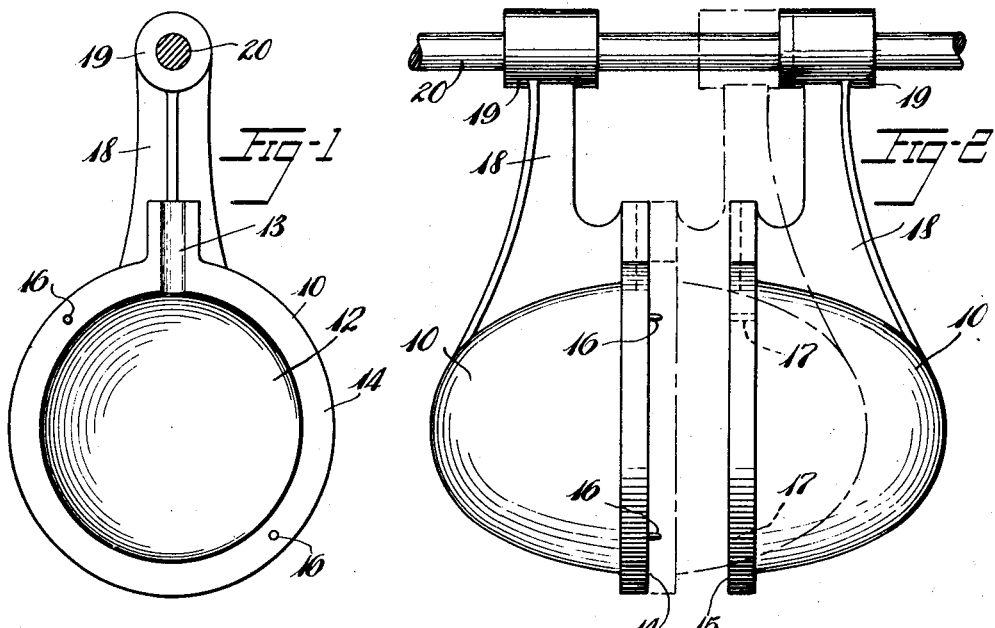
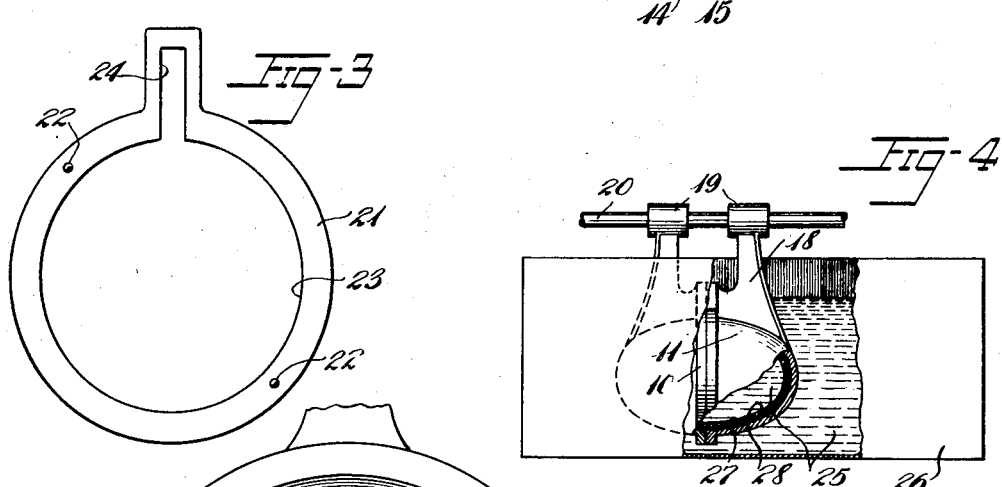
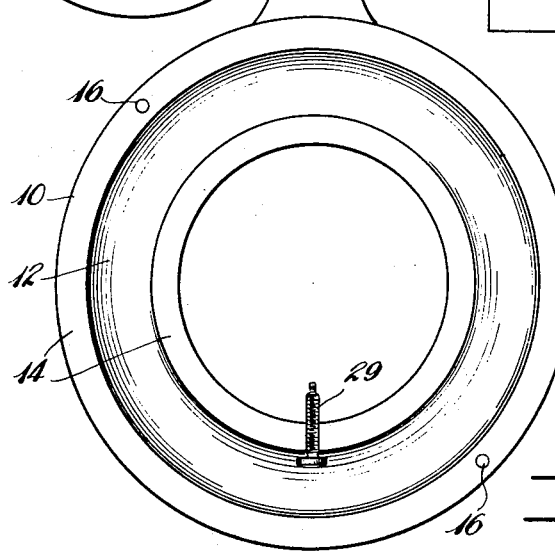

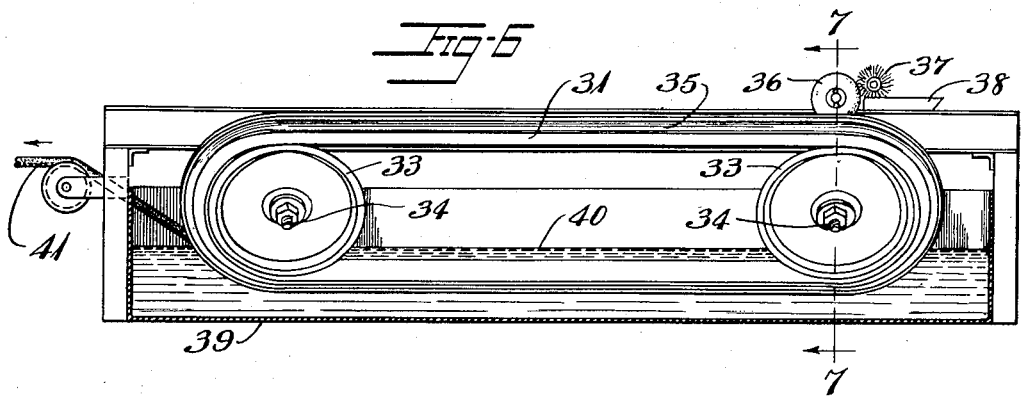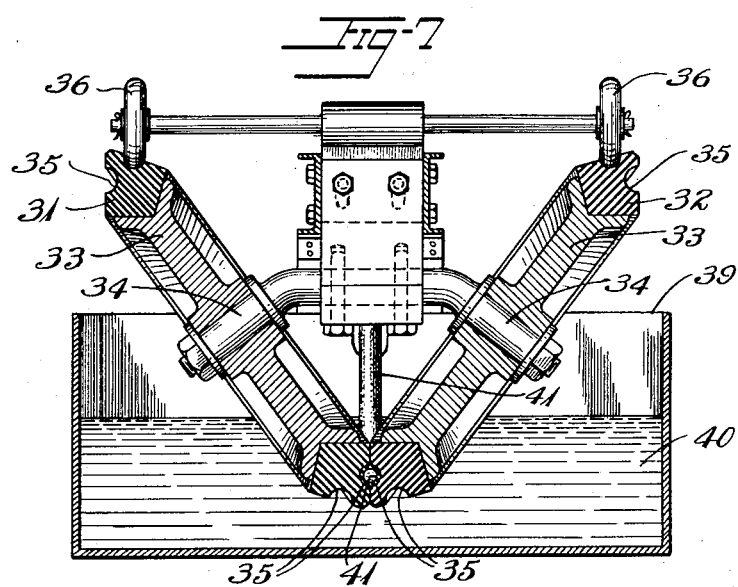

1,949,502

UNITED STATES PATENT OFFICE

1,949,502
METHOD OF MAKING HOLLOW RUBBER ARTICLES

Andrew Szegvari, Akron, Ohio, assignor to American Anode, Inc., Akron, Ohio, a corporation of Delaware Application March 26, 1930, Serial No. 439,036

9 Claims. (Cl. 18—58)

This invention relates to the art of rubber manufacture and particularly to the manufacture of hollow rubber articles directly from aqueous dispersions of rubber.

Heretofore it has been proposed to manufacture rubber articles by the coagulation of the rubber contained in latex or other equivalent dispersion on the surface of a form. This process, however, has not successfully been applied to the manufacture of closed hollow articles, for the forms could not be removed from within such articles without destroying either the articles or the forms.

This invention consists in manufacturing closed hollow bodies by the coagulation of latex contained within hollow forms by the diffusion of coagulating ions from the inner surface of the forms into the latex. After the layer of coagulated rubber has acquired the desired thickness, the excess latex, if any, is poured out, and the article removed from the form. The invention will be more particularly described in connection with a specific embodiment, reference being had to the accompanying drawings.

Fig. 1 represents one-half of a mold for the manufacture of a seamless football bladder according to this invention. Fig. 2 represents both halves of the same mold in operative relationship. Fig. 3 represents a mask used in conjunction with the molds of Figs. 1 and 2. Fig. 4 is a diagrammatic view of the mold showing a bladder in the process of manufacture. Fig. 5 is a view of a portion of one-half of a mold for the manufacture of an inner tube for automobile tires according to this invention. Fig. 6 is a side view partly in section of a machine for the continuous manufacture of tubing, and Fig. 7 is a section through Fig. 6 on the line 7, 7.

If it is desired to manufacture an oval football bladder, a mold, which may be of metal, is prepared with a cavity of the proper size and shape. The mold is made in halves, so as to permit the removal of the bladder after it is formed. In Fig. 1 one-half of such a mold 10 is shown, containing half of the oval cavity 12, and half of a cylindrical extension 13 in which is to be formed the tube through which the bladder will be inflated. As shown in Fig. 2, the mold half 10 has a plane face 14 which engages with the corresponding face 15 of the other half 11 of the mold. Pins 16, 16, and corresponding holes 17, 17, assure the correct registry of the two mold halves. The two halves of the mold are so mounted as to be quickly and easily opened and closed. For example, the two parts may each be made integral with a supporting arm 18 and sleeve 19 adapted to slide upon a bar 20. A mask 21, shown in Fig. 3, provided with cylindrical caps 22, 22 to fit over the pins 16, 16, has an orifice 23 of the same diameter as the cavity of the mold, with an extension 24 corresponding to the cylindrical extension 13. The mask is designed to cover and protect the surface 14, hence the outside of the mask may be the same size as this surface, or it may be somewhat larger, but the inside is cut away so as to expose the whole of the cavity 12.

The invention is carried out by separating the two halves 10 and 11 of the mold, and placing the mask 21 in position on the mold half 10, covering the surface 14. A latex coagulant is now applied so as to cover the cavity 12 and its cylindrical extension 13 with a uniform coagulating film. This is most quickly and uniformly accomplished by directing a spray of the coagulant on the surface of the cavity, by means of an atomizer or spray gun, but the coagulant may also be applied by painting or any other equivalent means, if preferred. The mask 21 is removed and the other half of the mold is similarly treated, using the same or a similar mask. The cavity of the mold is thereby provided with a substantially uniform film of coagulant, which, however, does not extend beyond the cavity, the external surfaces of the mold having been protected from contact with the coagulant. The mold is now lowered beneath the surface of a liquid rubber latex, the two halves 10 and 11 of the mold being brought together as soon as the mold is completely submerged and all air bubbles are eliminated from the cavity.

The latex entrapped within the mold is progressively coagulated by coagulating ions diffusing from the coagulant into the latex, the thickness of the coagulated deposit depending on the time of contact of the latex with the coagulant-coated mold. Since the coagulant on each part of the mold extends right up to the line of junction, and since the parts are joined almost immediately after their immersion in the latex, the deposit formed by the coagulation bridges over the joint and produces an absolutely seamless rubber article. Fig. 4 shows the mold 10—11 immersed in and containing the latex 25 in a suitable tank or container 26. The coagulant film 27 has produced a seamless coagulated article 28 within the mold. After the coagulated layer 28 has attained the desired thickness the mold is removed from the latex and inverted, allowing the excess latex contained therein to drain through the tubular extension 13 back into the tank 26. A narrow tube may be inserted to assist air in entering the interior of the mold to displace the latex.

The bladder in the mold may then be refilled with water which may contain a small proportion of acetic acid or other coagulant to insure the complete coagulation of the inner surface and to prevent adhesion of the inner surfaces if the bladder should collapse after removal from the mold. The mold is then immersed in a tank of running warm water and opened under the water level. The bladder is removed from the mold and allowed to remain in the tank until the greater part of the water-soluble material has been leached out of the wet rubber. It is then removed from the washing tank, drained, lightly inflated to prevent collapse during drying, and dried either at room temperature or at an elevated temperature in a drying cabinet.

A mold half designed for the manufacture of annular hollow articles such as inner tubes for automobile tires is illustrated in Fig. 5. The mold half 10 contains half of the toroidal cavity 12, the mold half having a plane surface 14 and pins 16, 16, which register with the corresponding parts of the opposite mold half, not shown. In addition, the mold is provided with a cylindrical aperture, one half of which lies in each mold half, to receive the valve stem 29. This inner tube mold is manipulated in much the same manner as the smaller mold described above. The cavity is coated with a film of coagulant, the remainder of the mold being suitably protected.

The valve stem with the valve mechanism removed is then placed in its groove in one mold half, preferably with its base 30 separated from the wall of the mold by a distance considerably greater than the thickness of the finished tube. The mold is then immersed in latex and closed, the latex being allowed to remain in the mold until the coagulated layer has acquired the desired thickness. The removal of the excess uncoagulated latex is not quite as simple as from the simpler football bladder mold described above, because of the shape of the mold and the location of the aperture. It is readily accomplished, however, by pushing the valve stem 29 down until it almost touches the opposite rubber layer and blowing air in under slight pressure through a narrow tube inserted in the valve stem for that purpose. The air displaces the latex which wells out through the valve stem. The small amount of liquid latex remaining in the mold is then distributed over the inner surface by rotating the mold, the continuing diffusion of the coagulant soon causing its coagulation. Uncoagulated latex is readily removed from the threads of the valve stem by washing with dilute ammonia water. The mold is then opened and the rubber inner tube washed and dried. A valve patch of conventional make-up may be slipped over the valve stem and cemented to the tube. After vulcanization of the rubber, the washer and nut are placed on the valve stem and drawn up tight.

The specific procedure described above is merely illustrative of one embodiment of the method of this invention, the method being susceptible of numerous modifications in its various steps, some of which will be enumerated below.

The hollow mold within which the rubber is coagulated may be made of any sufficiently rigid material which has no objectionable effect on latex or other aqueous dispersions, for example, iron (preferably stainless), aluminum, wood, glass, porcelain, hard rubber, etc. The coagulant which is applied to its inner surface will ordinarily contain either an acid or a salt of a polyvalent metal as the active coagulating agent. The coagulant is preferably a substance which is non-volatile, or substantially so, completely soluble in water, capable of wetting the form satisfactorily as to give rise to a uniform thin film, and preferably soluble in a volatile solvent, but of such a nature as to remain as a viscous liquid or semi-solid upon evaporation of the solvent.

An example of a preferred coagulant which admirably fulfills these conditions is a solution of calcium nitrate in acetone or alcohol. The solution is clear and limpid and is very readily applied to any surface. The solvent soon evaporates, leaving a semi-solid residue of hydrated calcium nitrate of such a high viscosity that it undergoes practically no flow in thin films. However, other types of coagulants may be applied to the cavity of the mold, either alone or dissolved or suspended in a volatile or non-volatile medium, either with or without the addition of substances which increase the viscosity of the coagulant solution or prevent it from crsytallizing or otherwise affect its properties in a desirable manner.

The aqueous dispersion of rubber which is employed many consist of the natural latex of rubber, gutta-percha, balata, or other rubber-like product, or artificial aqueous dispersions of these substances or of synthetic rubber, reclaimed rubber, rubber isomers, and related products. It may contain sulphur or other vulcanizing agents, accelerators, pigments, fillers, etc. either contained in the dispersed globules or as separate dispersed particles. If desired, the rubber may be vulcanized in the dispersed condition, or it may be vulcanized in the more usual way, either to soft or hard rubber, after deposition and drying.

In some cases it will be found most convenient to apply the coagulant to the mold by closing the mold, filling it with a coagulant solution and then pouring out the excess, leaving a thin film on the walls of the cavity. The mold may then be refilled with the latex, which is allowed to remain within the mold until a layer of the desired thickness has coagulated. This procedure has the advantages of simplicity, but the disadvantage that it is more difficult to control the manner in which the latex first comes in contact with the coagulant, so that air bubbles are somewhat more likely to be entrapped within the rubber than in the preferred embodiment described above.

It will be evident that this invention is not necessarily limited to the production of individual articles, but that it may likewise be employed in the manufacture of continuous tubing by employing suitable molds, which may consist of a pair of flexible endless bands which cooperate to form a channel on the inner, coagulant-coated walls of which the tube is produced.

In Fig. 6 and Fig. 7 a pair of endless bands 31 and 32, which may be made of rubber or other suitable flexible material, pass around two pairs of guide wheels 33, 33, one pair of which is driven at a uniform slow rate of speed by any suitable means, not shown. The wheels 33, 33 of each pair are supported on axles 34, 34 which are inclined so that the wheels are closely adjacent at their lower periphery and separated at their upper periphery. The bands 31 and 32 are therefore brought into abutting relationship in their lower reaches and are separated in their upper reaches. They are provided with continuous grooves 35, 35, in their abutting surfaces, so shaped as to define the contour of the tubing, in this case semi-circular grooves to form ordinary circular tubing. Similar grooves are preferably formed in the other side of each band in order to render the bands nearly symmetrical so that they may flex uniformly in passing around the guide wheels, and so that they may be reversed on the guide wheels if desired.

Coagulant rollers 36, 36 run in the pair of grooves 35, 35 which define the mold cavity, the rollers being kept supplied with coagulant, as by revolving brushes 37, 37 dipping in a coagulant trough 38. The lower reaches of the flexible bands 31, 32 run in a tank 39 filled with latex 40. The coagulant-coated grooves are accordingly filled with latex before they abut to close the mold channel. During the passage of the bands from one pair of guide wheels 33, 33 to the other, the coagulant causes the coagulation of the portion of the latex in immediate contact with the walls of the grooves to a continuous tube 41. As the bands pass around the second pair of guide wheels and separate again, the tube 41 is withdrawn and dried and vulcanized in the conventional manner. The uncoagulated latex from the center of the tube flows out the free end of the tube as the semi-finished tube 41 is withdrawn from the liquid bath.

The wall thickness of the tube can readily be adjusted by varying the speed of the machine or the length of the lower reach of the bands 31, 32.
The invention may even be carried out without filling the mold completely, by coating the cavity of the mold with a coagulant and then introducing a certain quantity of latex, say just the quantity required to produce an article of the desired thickness, and rotating the mold in such a manner that the liquid latex flows successively and repeatedly over every part of the cavity. Each successive film of latex is in turn coagulated by diffusion of the coagulant from underneath, until finally the entire mass of latex is distributed over the inner surface of the cavity as a uniform layer of coagulated rubber.

It is not always necessary to wash the coagulated rubber, but it is preferred to do so, for the physical properties of the rubber are improved by eliminating water-soluble substances therefrom. This is especially important for those articles which are required to withstand the action of high-tension electricity or of water or corrosive liquids.

The finished article may be vulcanized in any of the usual ways, the choice depending largely upon the nature of the article. Inner tubes and football bladders would ordinarily be vulcanized in heated hollow molds, being pressed firmly against the mold by internal air or steam pressure. Smaller articles such as syringe bulbs would be packed in soapstone and vulcanized in steam. Very thin articles could be vulcanized by the cold process by applying sulphur chloride or other equivalent substance to the surface of the articles.

It is to be understood that the term "rubber" unless otherwise limited is employed in the appended claims in a generic sense to include caoutchouc, whether natural or synthetic, reclaimed rubber, balata, gutta-percha, rubber isomers, and like products whether or not associated with vulcanizing agents, pigments, or other compounding ingredients.
Although a preferred method of carrying out this invention has been described in considerable detail, it is to be understood that the invention is not limited thereto, for the process described is susceptible of numerous modifications and variations in its several parts, without exceeding the scope of this invention or of the appended claims.

I claim:

1. In the method of making hollow rubber articles directly from aqueous dispersions of rubber, the steps of coating the cavity of a divided hollow mold with a coagulant, immersing the parts of the mold separately in a coagulable aqueous dispersion of rubber, and uniting the parts beneath the surface of the liquid.

2. The method of making hollow rubber articles which comprises coating the cavity of a divided hollow mold with a viscous liquid film of a coagulant, immersing the parts of the mold separately in a coagulable aqueous dispersion of rubber, uniting the parts beneath the surface of the dispersion, and removing the excess uncoagulated dispersion from within the mold after the coagulated layer has attained the desired thickness.

3. The method of making hollow rubber articles which comprises coating the cavity of a divided hollow mold with a viscous liquid film of a coagulant, immersing the parts of the mold separately in a coagulable aqueous dispersion of rubber, uniting the parts beneath the surface of the dispersion, removing the excess uncoagulated dispersion from within the mold after the layer of coagulated rubber has attained the desired thickness, and washing and drying the rubber.

4. The method of making hollow rubber articles which comprises coating the cavity of a divided hollow mold with a viscous liquid film of a coagulant, immersing the parts of the mold separately in a coagulable aqueous dispersion of rubber, uniting the parts beneath the surface of the dispersion, removing the excess uncoagulated dispersion from within the coagulated rubber article and replacing it with water, opening the mold beneath the surface of water and washing the rubber therein, and drying and vulcanizing the rubber.

5. The method of making hollow rubber articles which comprises spraying a solution of a salt of a polyvalent metal in an organic solvent over the inner surface of a divided hollow mold, immersing the parts of the mold separately in a coagulable aqueous dispersion of rubber, uniting the parts beneath the surface of the dispersion, removing the excess uncoagulated dispersion from within the coagulated rubber article, and washing, drying, and vulcanizing the rubber.

6. The method of making hollow rubber articles which comprises spraying a solution of a salt of polyvalent metal in a volatile organic solvent over the inner surface of a divided hollow mold, the other surfaces of the mold being protected against contact with the coagulant, immersing the parts of the mold in a coagulable aqueous dispersion of rubber, uniting the parts beneath the surface of the dispersion, removing the excess uncoagulated dispersion from within the coagulated rubber article, removing the article from the mold beneath the surface of water and washing the rubber therein, and drying and vulcanizing the rubber.

7. The method of making rubber tubing which comprises continuously advancing a pair of flexible endless bands which cooperate to define a channel of the shape of the tubing, coating the surfaces of the channel with a coagulant, juxtaposing the bands and filling the channel with an aqueous dispersion of rubber.

8. The method of making rubber tubing which comprises continuously advancing a pair of flexible endless bands which cooperate to define a channel of the shape of the tubing, coating the surfaces of the channel with a coagulant, juxtaposing the bands beneath the surface of a bath of liquid latex, and finally draining the uncoagulated latex from the tube formed by the coagulation of the latex in contact with the walls of the channel, and removing the tube from the channel defined by the said bands.

9. The method of making an endless hollow annulus which comprises separately coating with a coagulant the surfaces of the cavity of each of a pair of cooperating mold sections together defining an annular cavity, immersing the mold sections in latex and uniting them beneath the surface of the latex, and finally draining the uncoagulated latex from within the annulus.

ANDREW SZEGVARI.